United States Patent [19]

Libbet et al.

[11] 3,757,036

[45] Sept. 4, 1973

[54] ELECTROSTATIC RECORDING METHOD AND APPARATUS

[75] Inventors: Albert H. Libbet, Eliot, Maine; David R. Spencer, Waltham, Mass.

[73] Assignee: EG & G, Inc., Bedford, Mass.

[22] Filed: Apr. 5, 1972

[21] Appl. No.: 241,187

[52] U.S. Cl. .......................... 178/6.6 R, 346/74 ES
[51] Int. Cl. .......................... G11b 9/08
[58] Field of Search .................. 346/74 ES; 178/6.6

[56] References Cited

UNITED STATES PATENTS 3,484,792 12/1969 Golo .............................. 346/74
3,484,791 12/1969 Saeger ............................ 346/74

*Primary Examiner*—Terrell W. Fears
*Attorney*—Ralph L. Cadwallader et al.

[57] ABSTRACT

Method for electrostatic recording utilizing translatory motion between a stylus or styli and an electrostatic recording medium, including the steps of overlapping recorded lines and depositing a charge of one polarity on the recording medium through the stylus when a signal is to be recorded while depositing a charge of opposite polarity on the recording medium through the stylus during the absence of a signal to be recorded. Converting reflectance to suitable signals for area modulation provides grey scale recording. An exemplary apparatus for performing the method also is disclosed.

49 Claims, 15 Drawing Figures

RECORD CELL

ELECTROSTATIC RECORDING METHOD AND APPARATUS

BACKGROUND OF THE INVENTION

The present invention relates to graphic recording and in particular to electrostatic grey scale recording. The resolution of an image formed on an electrostatic recording medium responsive to a signal applied to the recording stylus depends upon the dimensions of the end of the stylus, its shape, the time duration of the signal, the relative velocity between the medium and the stylus, and, of course, the magnitude of the signal voltage applied to the stylus. If the end of the stylus is circular in shape, the length of the image in the direction of the stylus/paper velocity is roughly equivalent to the diameter of the circular end of the stylus plus the time duration of the applied signal times the relative velocity of motion between the stylus and the recording medium. The dimension of the image perpendicular to the stylus/paper velocity is roughly equivalent to the diameter of the circular end of the stylus. In, for example, a facsimile recorder, a single, cylindrical stylus of rugged construction has a diameter on the order of 10 mils. Heretofore, it has been difficult to produce a mark on an electrostatic recording medium even as small as the diameter of a cylindrical stylus and thus the resolution of the copy has been limited to about 100 lines per inch.

Efforts to overcome this difficulty in facsimile systems include the apparatus and methods disclosed in Gold U.S. Pat. No. 3,484,792 and in Saeger et al. U.S. Pat. No. 3,484,791, both issued on Dec. 16, 1969. The Gold patent discloses a construction wherein a recording or marking pulse of a first polarity is applied to the stylus immediately followed by a neutralizing pulse of a polarity opposite to the first polarity. Inasmuch as the stylus moves with respect to the recording medium while the mark is being made, the Gold construction provides a mark having a length in the direction of the paper/stylus velocity corresponding only to the time duration of the applied signal. While this construction makes it possible to record with a mark shorter in the direction of the paper/stylus velocity, there is no appreciable shortening of the mark in a direction perpendicular thereto. For example, if a solid line is recorded with a cylindrical stylus, the width of the line is still roughly equal to the diameter of the stylus. The ability to record with a mark shorter in the direction of the paper/stylus velocity is also achieved with the system disclosed by John W. Smith in now abandoned Application Ser. No. 189,545 filed on Oct. 15, 1971 and assigned to the same assignee as the present application.

The Gold construction utilizes a transformer to which a marking pulse is applied. Upon termination of the marking pulse, the collapsing magnetic field produces a canceling voltage pulse at the output of the transformer which is opposite in polarity to the polarity of the preceding marking pulse. The Smith method maintains a canceling bias on the stylus.

In Saeger et al an AND circuit and a delay circuit shorten the time duration of an input video pulse by any desired amount, such as, by the diameter of a cylindrical stylus. However, the width of a recorded line is still roughly equal to the diameter of the stylus and the minimum spot length in the direction of the paper/stylus velocity is still approximately equal to the stylus diameter.

SUMMARY OF THE INVENTION

The present invention provides an electrostatic recording method in which there is translatory motion between a stylus or styli and an electrostatic recording medium or vice versa. An exemplary marking system includes means for depositing charges of opposite polarities by the stylus or styli responsive to control by a binary signal or signals. The system is so arranged that in the presence of a signal to be recorded, or a marking signal, a charge of one polarity is deposited by a stylus on the recording medium. In the absence of a marking signal the system is so arranged that the stylus deposits a charge of opposite polarity on the recording medium opposite the stylus. This continues while the recording medium feeds into the recorder except when a marking signal appears.

If, with these charges deposited by a cylindrical stylus, the incremental feeding of the paper in the direction perpendicular to the stylus motion is made smaller than the stylus diameter there is produced a line having a width, or distance in the direction perpendicular to the stylus motion, much less than the diameter of the stylus. The copy produced may have an improvement in resolution of six times or even more. For example, while the patented constructions of Gold and Saeger et al provide a resolution in the direction perpendicular to stylus motion up to approximately 100 lines per inch with 10 mil diameter styli, the method in accordance with the present invention provides a resolution in both directions greater than 600 lines per inch with 10 mil styli.

The invention also provides for grey scale recording of images. This is accomplished by ascertaining the reflectance of the desired copy in a defined area or "cell" and recording black on a portion of the corresponding area of the medium, the portion blackened being proportional to the reflectance value. This marking may be accomplished in one embodiment, by converting the level of reflectance to pulse duration, using the pulse to control the charge deposition and hence the proportion of each line increment marked black. In a second embodiment the cell may be considered as a matrix of $m \times n$ areas and the reflectance converted to a digital code controlling which of the $m \times n$ areas are blackened.

Figures 5A, 5B, 8, 10:
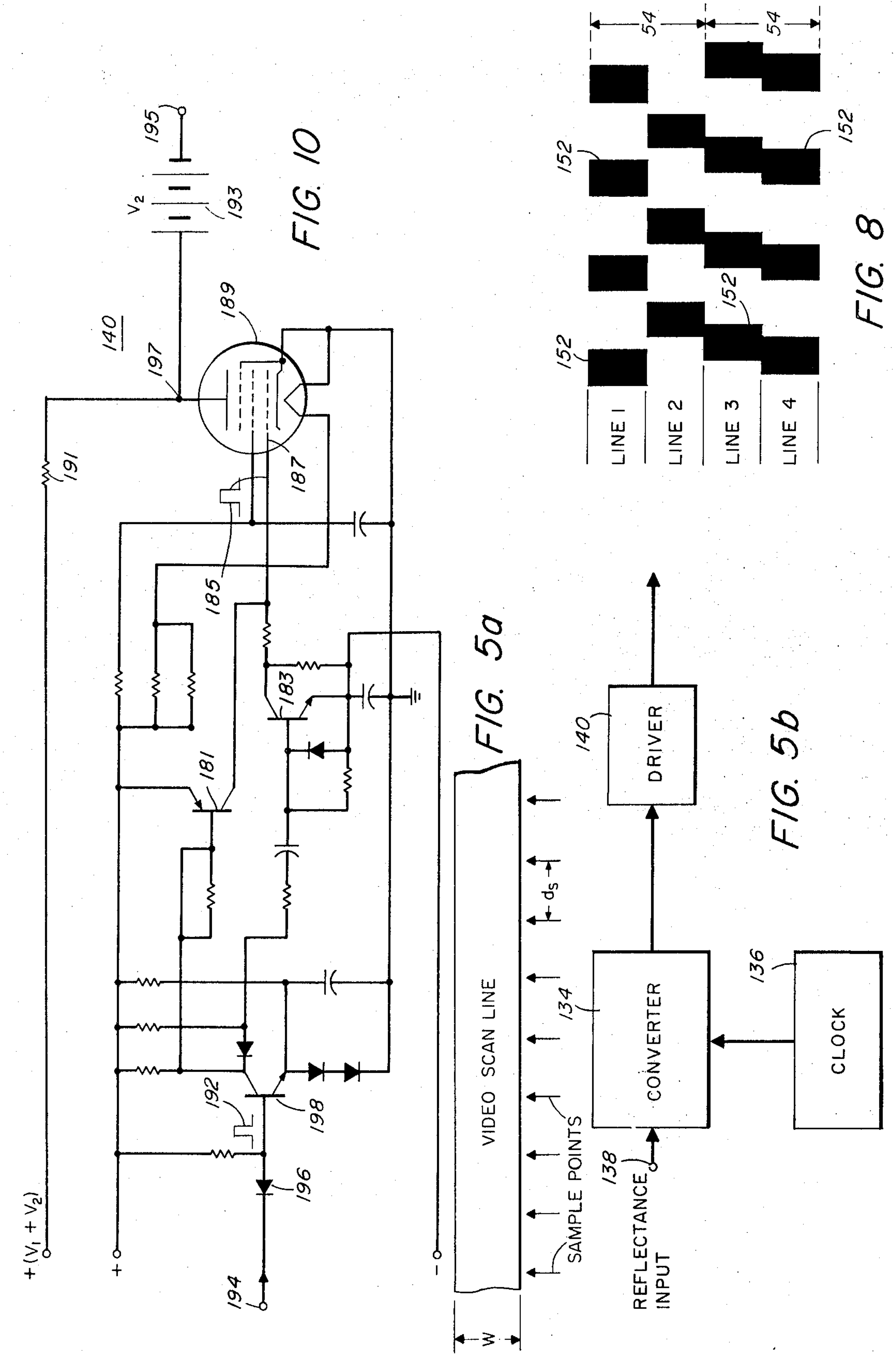
Figure 6:
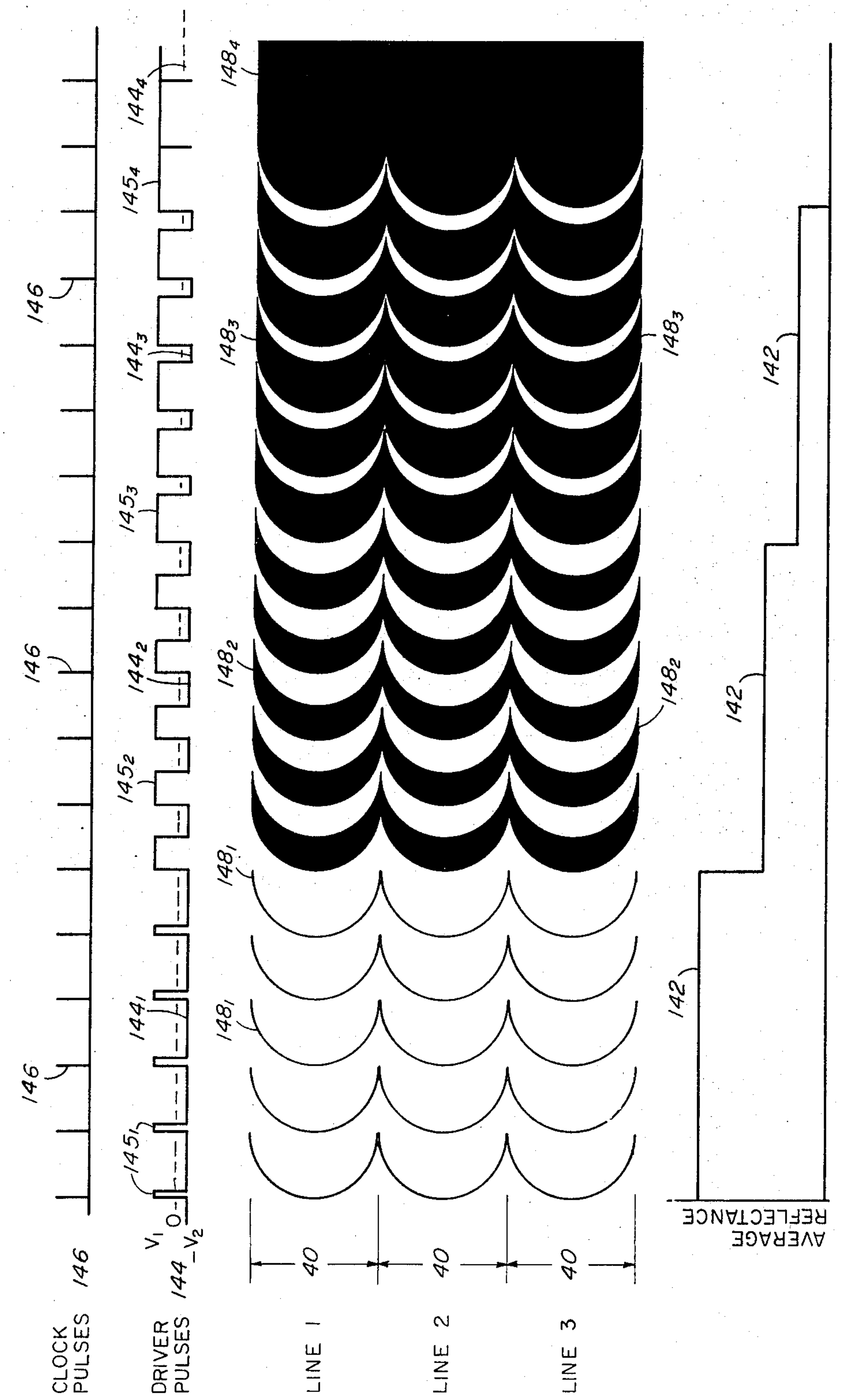
Figure 7:
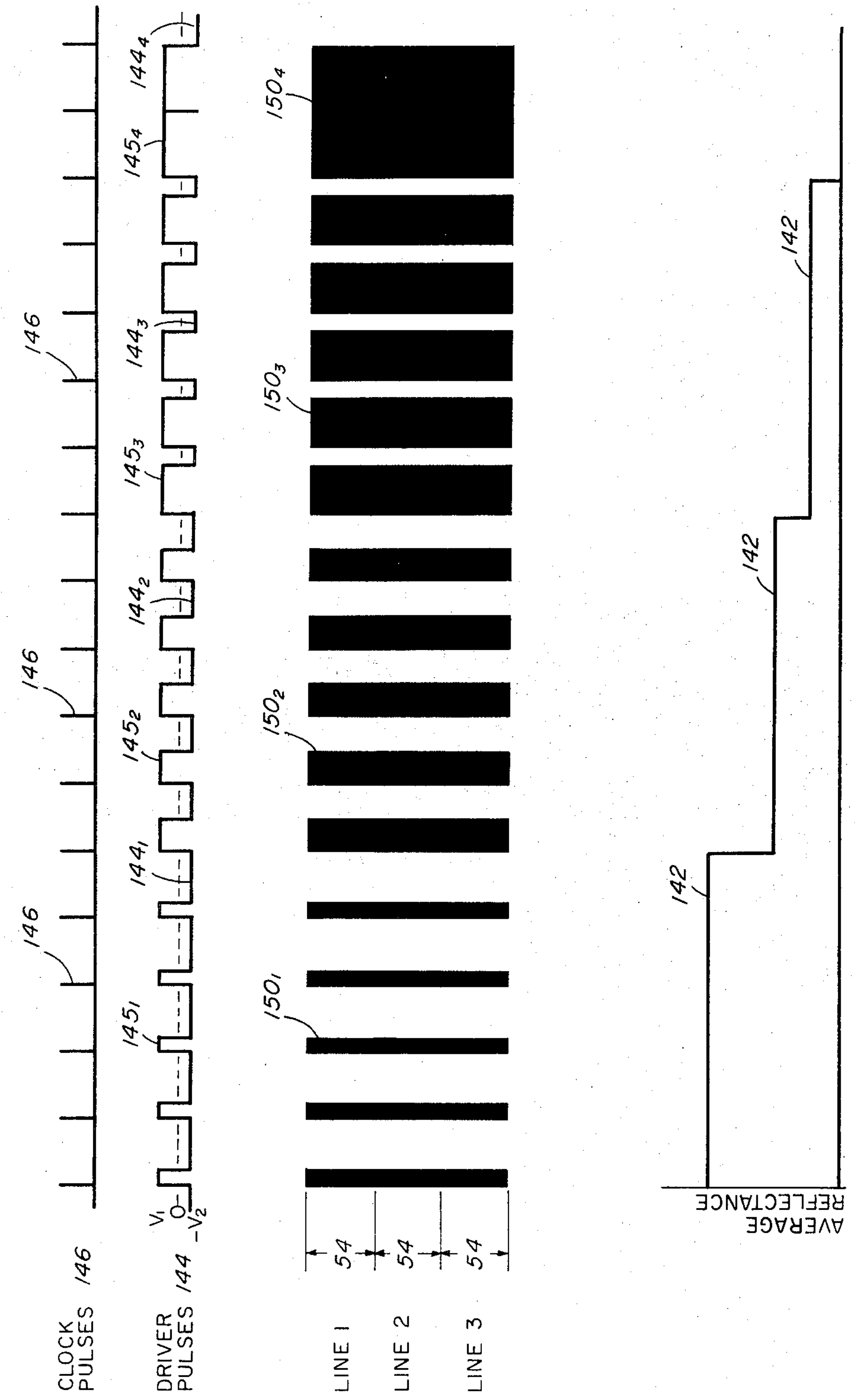
Figure 9:
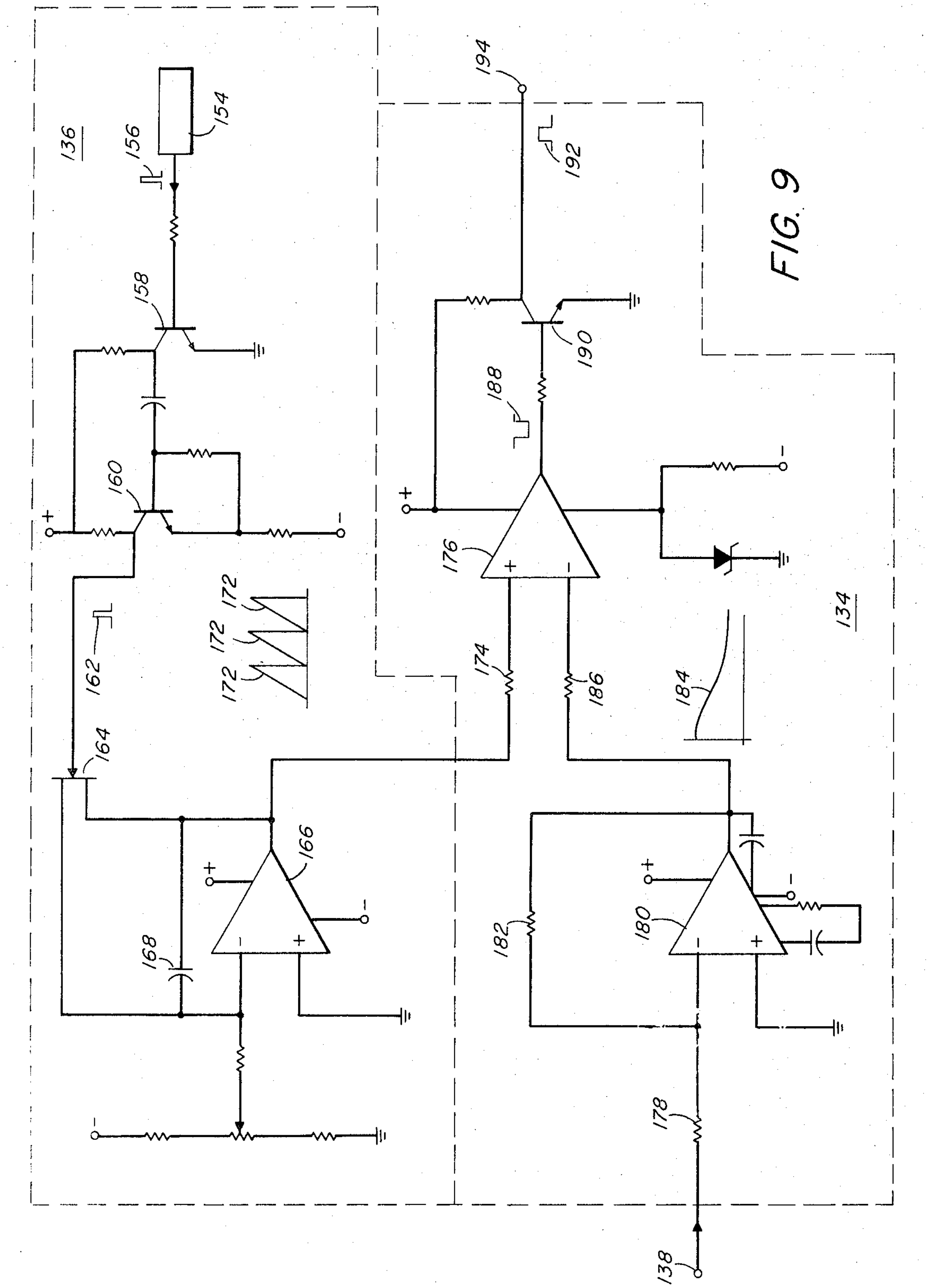
Figure 11:
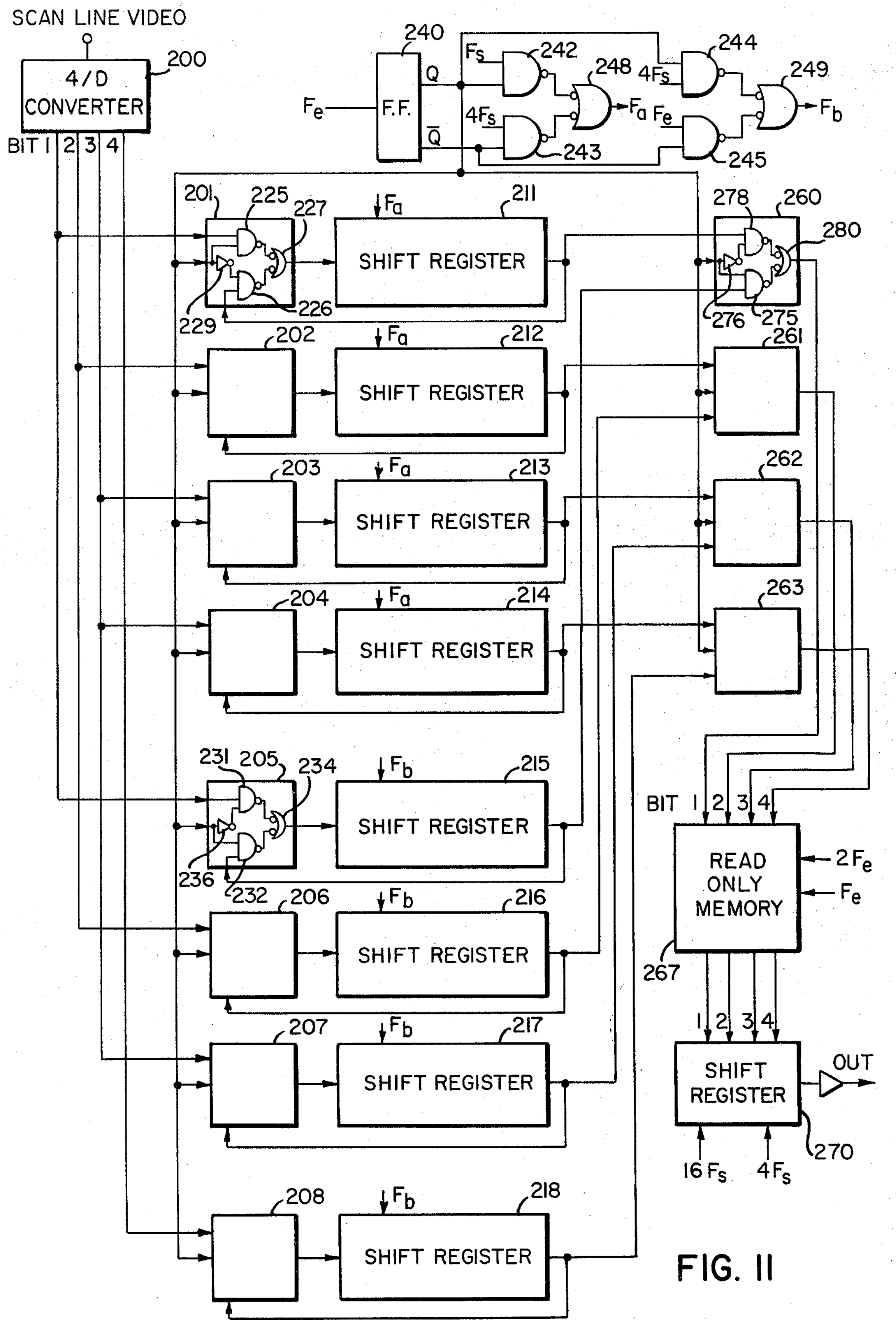
Figure 12:
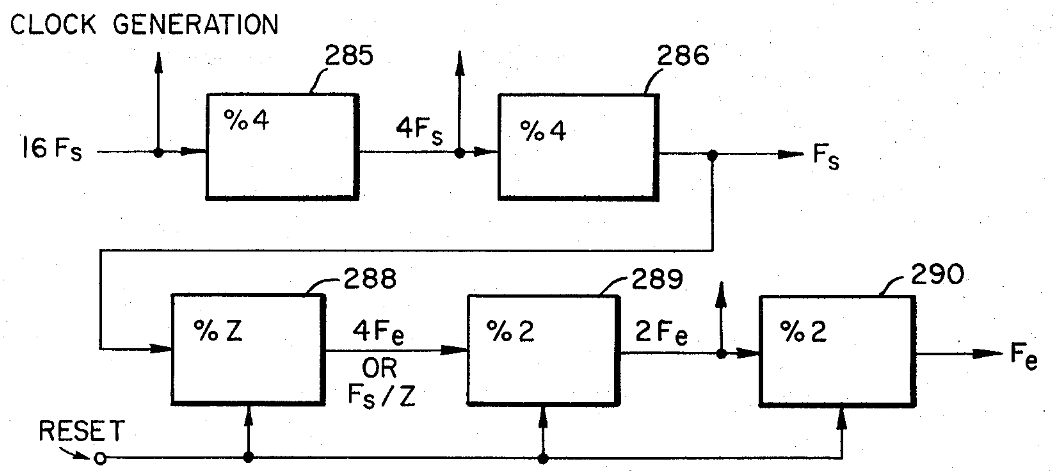
Figure 13A:
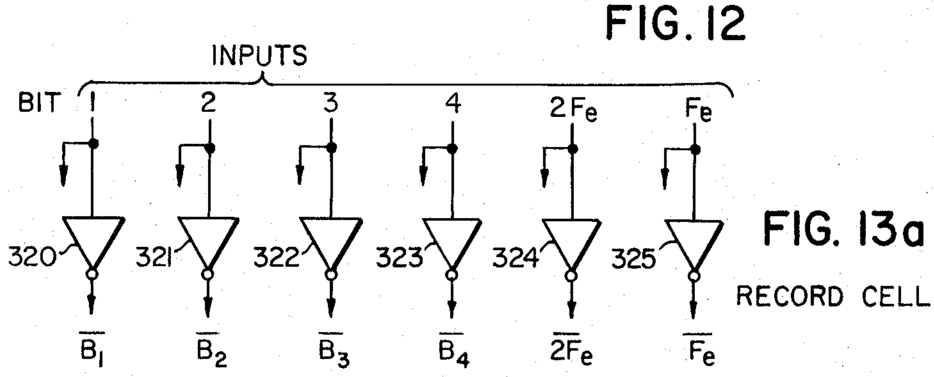
Figure 13:
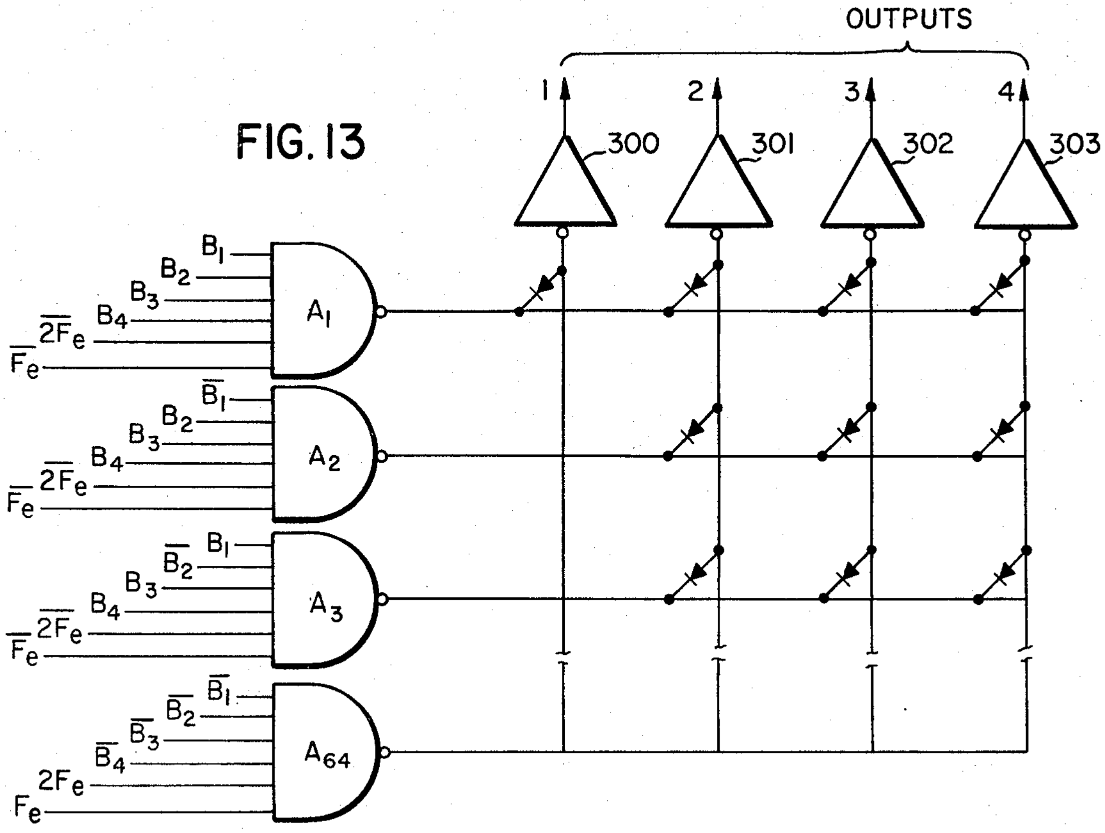

FIG. *5a* is a diagrammatic illustration of a sampling time chart useful in grey scale recording;

FIG. *5b* is a simplified block diagram of a reflectance conversion system useful in explaining FIGS. 6 and 7;

FIGS. 6 and 7 illustrate graphically, in enlarged form, grey scale recordings obtained with reflectance conversion where the stylus or styli have circular ends and rectangular ends respectively, with line feed increments being substantially equal to the vertical dimensions of the styli;

FIG. 8 illustrates the grey scale recording obtained with a rectangular end stylus or styli and reflectance conversion with a clock that is not synchronous with line scan;

FIGS. 9 and 10 schematically illustrate an exemplary embodiment of a reflectance conversion system;

FIG. 11 is an illustration in block diagrammatic form of a second embodiment of a reflectance conversion system useful in the practice of this invention;

FIG. 12 is an illustration in block diagrammatic form of a clock signal generation circuit to be employed in conjunction with the circuit of FIG. 11; and FIGS. 13 and 13a are illustrations in block diagrammatic form of a read only memory arrangement to be used in conjunction with the embodi-ment of FIG. 11.

BACK BIAS

Figure 1:
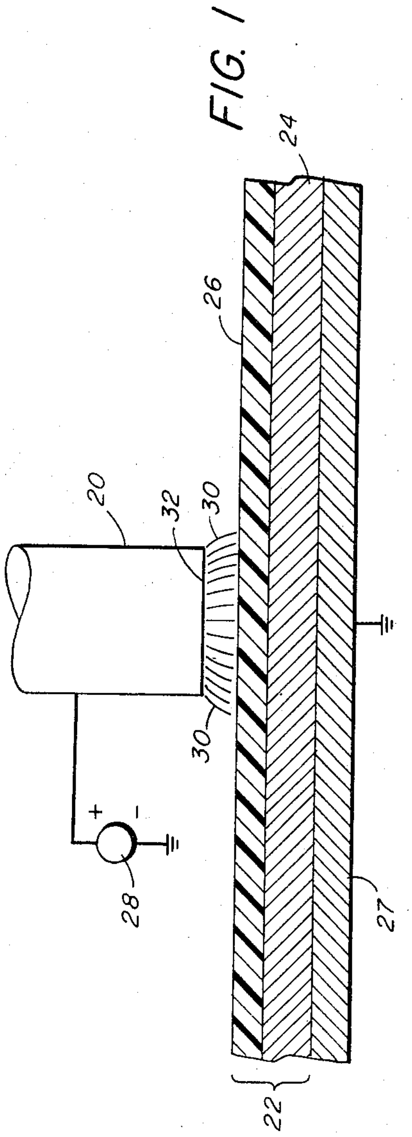
FIG. 1 illustrates diagrammatically and greatly enlarged a cylindrical recording stylus depositing charge on an electrostatic recording medium that contacts a grounded metal platen.

FIG. 1 is a greatly enlarged illustration showing cylindrical stylus 20 nominally in contact with electrostatic paper 22. Electrostatic paper 22 consists of conductive base 24 on which is coated dielectric material 26. The recorder system, not shown, maintains conductive base 24 in electrical contact with metal backing platen 27 which is grounded as shown. When grounded potential source 28 is caused to apply a voltage to stylus 20, local intense electrostatic field 30 ionizes the air in the region between the circumference of end 32 of stylus 20 and electrostatic paper 22. It is theorized that this field deposits either negative charge (electrons) or positive charge (+ions) into the paper, depending upon the polarity of potential source 28. FIG. 1 shows potential source 28 having a positive polarity; hence, in this example, +ions would be deposited into paper 22. The fields of the charged regions of paper 22 subsequently selectively attract a colored oppositely charged toner, not shown, which is later fixed in position, completing development of the recorded image.

Figure 2:
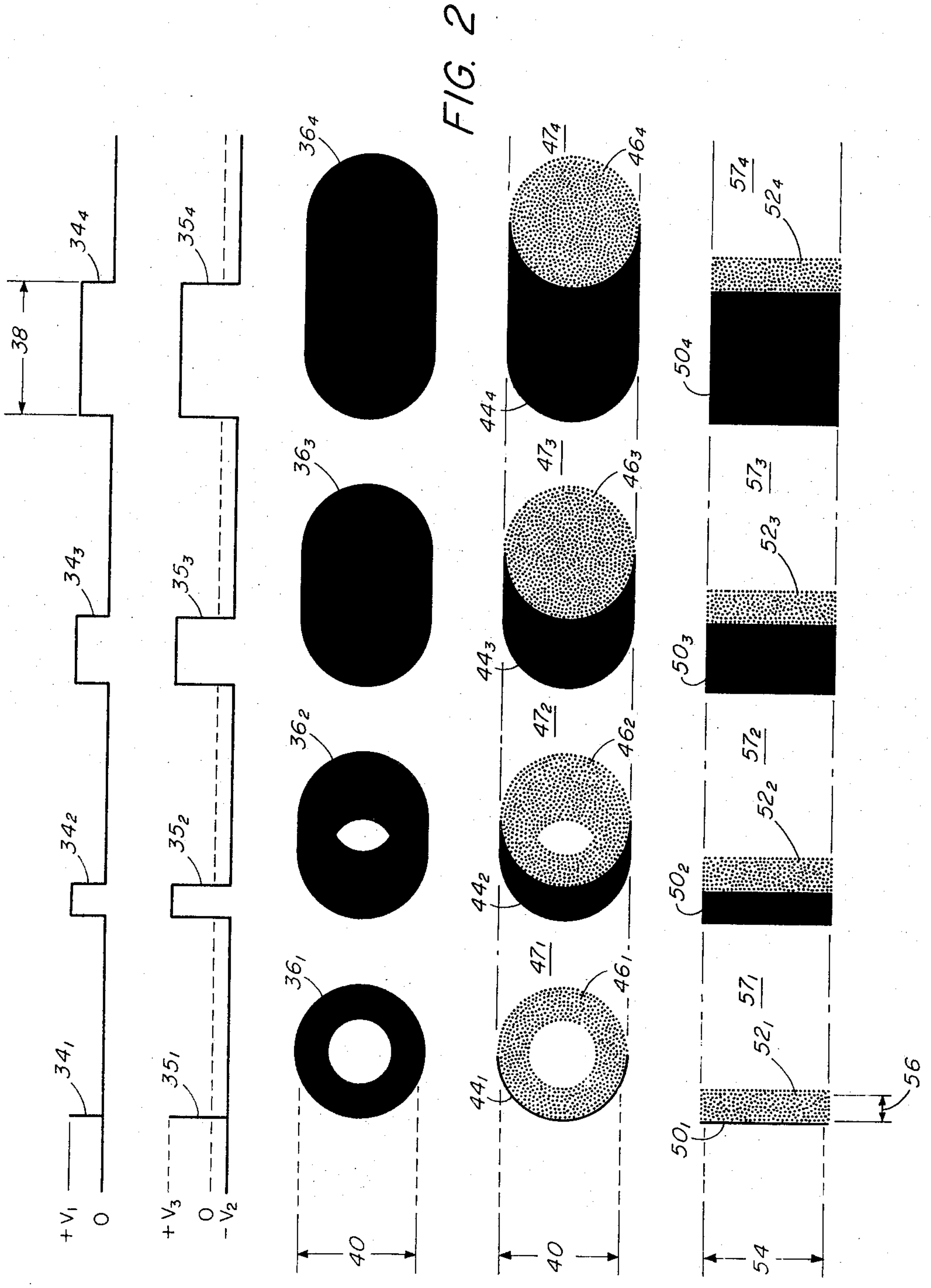
FIG. 2 illustrates graphically, for purposes of comparison, the images produced with several binary marking signals as one line of copy on an electrostatic recording medium with a cylindrical stylus and a rectangular stylus utilizing prior art systems.

Movement of stylus 20 and paper 22 relative to each other causes electric field 30 to sweep across paper 22 depositing charge in the region under it FIG. 2 shows voltage versus distance (or time, for a constant velocity of relative movement between stylus 20 and paper 22) waveform 34 formed of binary signals $34_1$, $34_2$, $34_3$ and $34_4$ having two values, $+V_1$ and zero, and charged areas $36_1$, $36_2$, $36_3$ and $36_4$ that result when this waveform is applied by potential source 28 to stylus 20. Consider charged area $36_1$ produced when binary signal $34_1$ has a first value, $+V_1$. Note that electric field 30 concentrates the charged area in an annular ring having an outer diameter slightly larger than diameter 40 of stylus 20. As the time durations at the first level of binary signals $34_n$ increase, as at $34_2$, $34_3$ and $34_4$, the swept areas $36_2$, $36_3$ and $36_4$ of charged fields increase. For example, binary signal $34_4$ has a time duration 38 equivalent to stylus diameter 40 and produces swept area $36_4$ of charged field which is slightly larger than twice the area of the end of stylus 20.

It will also be noted that recording systems utilizing cylindrical styli prior to the Gold invention produced areas of charged fields similar to $36_1$, $36_2$, $36_3$ and $36_4$ in FIG. 2.

Hereinafter the terms "use or application of a marking potential" will be understood to mean that a potential of proper polarity is applied to a stylus or styli to create a field between the stylus and recording medium to deposit charges creating a surface charge density in the recording medium of a predetermined area (charged field), which charges will attract toner of opposite polarity. The terms "use or application of a canceling potential" will be understood to mean that a potential of opposite polarity to the marking potential is applied to a stylus or styli to create a field between the stylus and recording medium to deposit charges of opposity polarity in the recording medium. This potential deposits charges at least sufficient to cancel or neutralize charges of opposite polarity already deposited in the medium in an area within the charging influence of the stylus during the time the canceling potential is applied. Note too, even if no charges of opposite polarity are present to be cancelled, that charges are deposited in the medium that will repel the toner which has the same polarity.

FIG. 2 also illustrates the charged areas produced by cylindrical stylus 20 having a diameter 40 when a waveform, not shown, combines with a potential of opposite polarity, $-V_2$, to apply binary signals $35_1$, $35_2$, $35_3$ and $35_4$ to stylus 20. Binary signals $35_n$ have two values, $+V_3$ and $-V_2$ with respect to zero reference. Binary signals $35_n$ produce charged fields in areas $44_n$ and $46_n$ in which a charge of one polarity has first been deposited when binary signals $35_n$ have a first value, $+V_3$. Dotted areas $46_1$, $46_2$, $46_3$ and $46_4$ represent areas in which the deposited charge has been cancelled by the other level of potential of opposite polarity, $-V_2$, of binary signals $35_n$. Here, charges of opposite polarity are deposited to cancel the charges first deposited. The remaining areas $44_n$ of deposited charge represent the convolution of the writing waveform with the trailing edge of cylindrical stylus 20. Note that areas $47_n$ have charged fields of opposite polarity created by the deposition of charges of opposite polarity occuring while binary signals $35_n$ are at level $-V_2$ and not canceling charges previously deposited. It is, of course, possible to reverse the polarities of the binary signal levels and achieve the same result if the polarity of the toner charge is also reversed. Furthermore, if only the polarities of the binary signal levels or the polarity of the toner charge are reversed, a negative image may be developed.

Note that with a binary signal level of opposite polarity to cancel deposited charges the spot dimension in the direction of travel equals the writing charge width (distance) and thus may range continuously upward from zero. Further, this eliminates annular rings such as $36_1$.

FIG. 2 also illustrates charged areas $50_n$ and canceled charged areas $52_n$ produced when binary signals $35_n$ are applied to a stylus, not shown, having a rectangular end, with a width 56 and a trailing edge having a length 54. Areas $57_n$ have fields of opposite polarity.

The aforementioned application of John W. Smith discloses a system for depositing charges and canceling charges by depositing charges of opposite polarity in the above manner.

REDUCED LINE INCREMENTS

Figure 3:
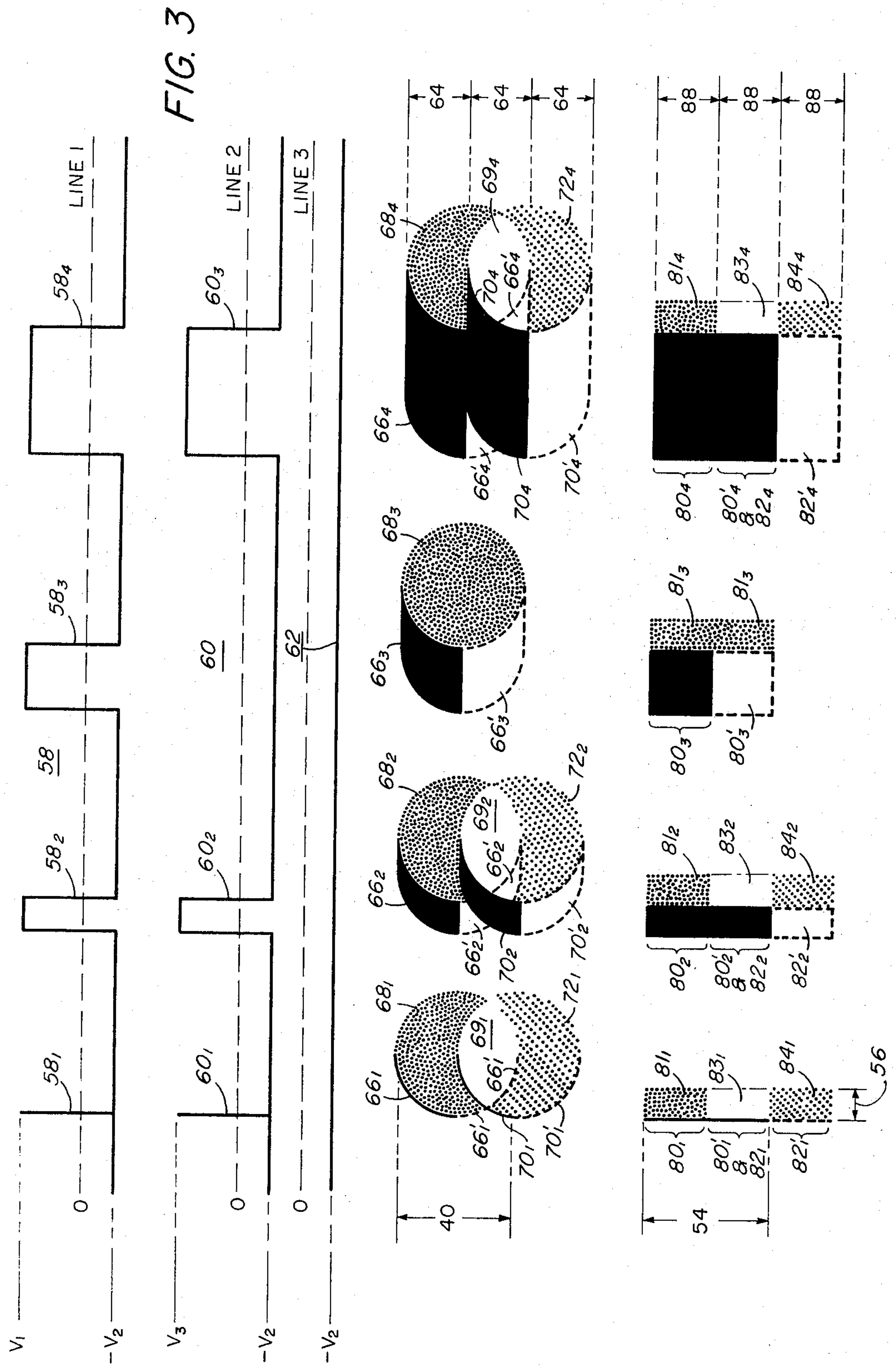
FIG. 3 graphically illustrates images produced with binary marking signals as three lines of copy on an electrostatic recording medium with a stylus or styli having a circular end and a rectangular end utilizing the method of the present invention.

FIG. 2 shows a reduction in writing spot size only in the direction of paper/stylus relative velocity, or writing direction, achieved with level, $-V_2$, to cancel charges previously deposited and to deposit charges of opposite polarity. Combining this feature with line increments that are fractions of styli dimensions in the direction perpendicular to the writing direction provides a reduction in writing spot size in such direction. FIG. 3 illustrates this result with styli similar to those of FIG. 2.

In FIG. 3 waveforms 58 and 60 illustrates binary signals $58_n$ and $60_n$ having levels $+V_1$ and $-V_2$ with respect to zero reference, and waveform 62 having level $-V_2$ applied to a stylus or styli for writing three successive lines of copy; for example, lines 1, 2 and 3 as shown. Note that line 3 contains no two-level signals, being at the $-V_2$ level. For a cylindrical stylus 20, or styli, line increments 64 are each equal, for purposes of illustration, to one half of stylus diameter 40.

Binary signals $58_n$ deposite charges of one polarity in areas $66_n$ and $66_n'$ when they are at level $+V_1$ and cancels charges deposited in areas $68_n$ and $69_n$ when they are at level $-V_2$. When line 2 is written, binary signals $60_n$ deposit charges of one polarity in areas $70_n$, $70_n'$, $69_n$ and $72_n$ when at level $+V_1$. When at level $-V_2$ binary signals $60_n$ cancel charges deposited in areas $66_n'$, $69_n$ and $72_n$. Then when line 3 is written, when contains no two-level signals, waveform 62 cancels charges deposited in areas $70_n'$. These results are obtained because the field of stylus 20 overlaps the area of the paper in which a stylus previously deposited charges except for the spacing of one line increment in a direction perpendicular to the writing direction.

FIG. 3 also illustrates the results obtained with a rectangular stylus, or styli, having a width 56 and length 54 as in FIG. 2 with line increments 88 each equal to one-half the length 54. Binary signals $58_n$ deposit charges of one polarity in areas $80_n$ and $80_n'$ and cancels charges deposited in areas $81_n$ and $83_n$ When line 2 is written, binary signals $60_n$ deposit charges of the one polarity in areas $82_n$ and $82_n'$ and cancels charged area $80_3'$ and charges deposited in areas $83_n$ and $84_n$. Then when line 3 is written, waveform 62 cancels charged areas $82_n'$.

EXEMPLARY FACSIMILE SYSTEM

Figure 4:
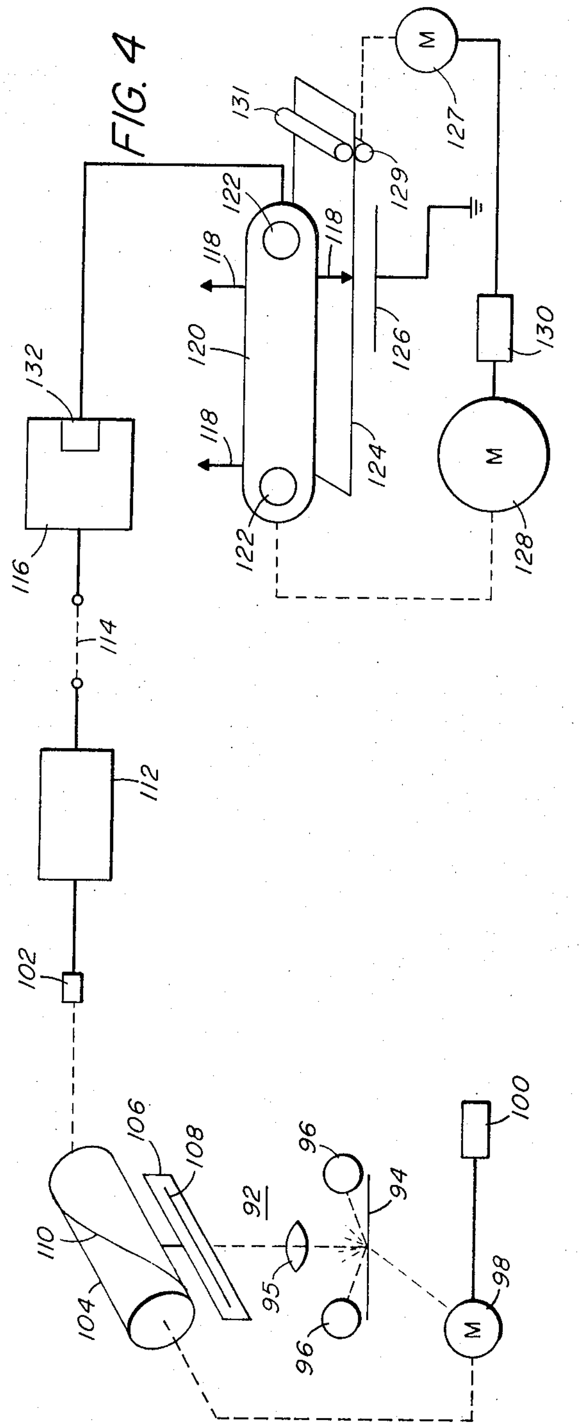
FIG. 4 diagrammatically illustrates a facsimile system utilizing the principles of the present invention.

Deposition and cancellation of charges and line increment feeding may be used in a facsimile system such as that graphically illustrated in FIG. 4 which shows facsimile transmitter 92 with a piece of copy such as document or photograph 94 being moved past a pair of viewing lights 96 by motor 98 operated by control 100. A light dissector interposed between copy 94 and photoelectric device 102 includes rotatable helix drum 104 and fixed member 106 having a straight narrow light path 108 positioned thereon. Rotatable drum 104 has helical light path 110 adapted to cooperate with light path 108 so that light reflected from copy 94 is passed to the interior of helix drum 104 in a line-by-line image dissection via lens 95. Helix drum 104 may be rotated by motor 98 or may be driven separately by another motor drive. The light passed to the interior of helix drum 104 is detected by photoelectric device 102 and its output signal passes to usual transmitter electronics 112, the output of which is transmitted by transmission line 114 to usual recorder electronics 116. The output of recorder electronics 116 is applied to one or more spaced styli 118 carried by belt 120 which is driven over a pair of rollers or pulleys 122. The recording medium 124 is moved in controlled increments in a direction perpendicular to the direction of motion of the styli. This controlled increment motion is provided by a motor 127 driving in rotational steps roller 129. the recording medium 124 being pressed against roller 129 by a compression roller 131.

In the operation of the facsimile system, copy 94 moves past lamps 96 so that light is reflected through straight line path 108 and helical light path 110 in series to the interior of helix drum 104. Photoelectric device 102 detects this light and converts it to an electronic signal which is processed through transmitter electronics 112, transmission line 114 and recorder electronics 116 to one of styli 118. The electronics is sich that an elec-trostatic image is applied to recording medium 124 by the styli 118 corres-ponding to a mark viewed by the image dissector drum 104. Recording medium 124 then passes through a toner for development as is well known in the art.

GREY SCALE RECORDING

In order to produce a grey scale recording of copy, the reflectance of the original document is sampled and the resultant values of reflectance for each sampling area or cell are converted to an analog or digital value. These analog or digital values are then used to control large deposition to achieve an average density of black marks on a white background corresponding to the measured reflectance values for the specific area.

Methods heretofore common in the art used to create electrostatic grey scale attempt to vary the amplitude of the electronic signal driving the styli. These methods have not proven capable of very high quality. The method described herein varies the percentage of the reflectance area or cell which is rendered black thereby creating an effective grey scale. The process may be likened to the halftone process used in newsprint. In general the reflectance area or cell would represent a distance $d_s$ along a scan line having a width w. This situation is illustrated in FIG. 5*a*, while FIG. 5*b* shows a general block diagram in which the reflectance input terminal 138 supplies a signal to a converter 134, which is clocked from a clock source 136 and provides an output signal to a driver 140. The latter provides a stream of binary signals that control the deposition and cancellation of charges to record the grey scale. The conversion performed in converter 134 may be basically a one dimensional conversion in which the variations in the amount of area marked with the toner to correspond to variations in the reflectance occur only along the direction of scan, each mark being the full width *w*. Alternatively the conversion may be two dimensional cells where each sample area or cell having the coordinates $d_s$ and $w$ may be considered as a matrix of $m \times n$ locations, the variation in reflectance or grey scale being achieved by the selection of which of the points in the matrix are marked with toner.

The first alternative which represents a linear variation of the marking, may be achieved, for example, by generating binary signals at a frequency higher than the number of signals required for resolution of a cell and varying the time duration of each signal according to the reflectance value. In general, for this arrangement, the following formula expresses the relationship of the reflectance, R, of the recorded copy to other parameters:

$$R = [R_p - (P_w/C_w)]\ (R_p - R_t)$$

where $R_p$ = the reflectance of the medium on which the image is being recorded, $R_t$ = the toner reflectance $P_w$ = the part of each clock period during which writing charges are deposited, and $C_w$ = the clock period.

The method and system present a sampled value of reflectance of the original document. Accordingly, it is necessary to have more samples per inch than the desired scan upper resolution limit. The digital/analog resolution subjective equivalence ratio, sometimes called the Kell factor, is given various values and is often ascribed the value 0.7. This would result in a sample rate of approximately 1/0.7 times the upper analog resolution to give equivalent copy.

In the two dimensional matrix approach, the number of black versus white elements or points of the matrix within the sample area is made proportional to the measured reflectance from the copy. In this approach, the reflectance of the cell, R, is related to the other parameters as follows:

$$R = [R_p\ W_e + R_t\ (m \times n - W_e)]/(m \times n)$$

where $W_e$ = the number of white elements.

Since in this latter approach, each line width *w*, will be expressed as a number, *m*, of traces with the selection for each one of these traces of whether or not each of the *n* points on the line will be darkened being controlled by the reflectance, then sufficient memory is required for each scan line input to provide for m recording traces, with appropriate conversions from the measured reflectance to the writing binary control signals for each trace. Relatively conventional techniques may be employed using memories of the type now available in the art, to generate this tracing information from a series of reflectance values for each increment $d_s$ of the scanned line.

GREY SCALE COPY PRODUCED

In FIGS. 6 and 7 curve 142 represents the average reflectance of lines 1, 2 and 3 (arbitrarily selected successive lines) of a document, such as document 94 of FIG. 4. One method of implementing the one dimensional embodiment of converter 132 is to provide for conversion of reflectance values at each clock time to time durations during which the binary signals will have one value or the other. Using this approach, reflectance conversion system 132 produces a plurality of binary signals having a value, $-V_2$, for time durations $144_n$, each terminated by a clock pulse 146 and each having a time duration for canceling deposited charges proportional to the amplitude of the average reflectance shown in curve 142. Areas $148_n$ of deposited writing charges result when the binary signals have a value $+V_1$ for time durations $145_n$ and illustrate the result obtained by recording lines 1, 2 and 3 with a cylindrical sytlus or styli 20 having a diameter 40, essentially no overlapping of lines and with clock pulses 146 synchronous with the line scan. Similarly, charged areas $150_n$ of FIG. 7 illustrate the deposited writing charges that result when the binary signals have a value, $+V_1$, for time durations $145_n$ and illustrate the result obtained by recording lines 1, 2 and 3 with a stylus having a rectangular end and a dimension 54 in the vertical direction. Again, as in FIG. 6 there is essentially no overlapping of lines and clock pulses 146 are synchronous with the line scan.

FIG. 8 illustrates charged areas 152 obtained when clock 136 is not synchronous with line scan. This may be preferred because the dot pattern is less obvious to the eye and tends less to create moire patterns in halftone screening when spot edges of one line do not align with spot edges of adjacent lines as in FIG. 7. Similarly, a dot pattern formed with a cylindrical stylus and non-synchronous clock may also be less obvious to the eye than one formed with a synchronous clock. Intermediate situations may be created using pseudo-random line to line changes of the clock phase, feedback shift register pseudo-random sequence generators being common in the logic design art.

The reflectance conversion system may also be used with line increments smaller than the stylus dimension in the direction perpendicular to the paper stylus velocity. FIG. 8 also illustrates charged areas 152 obtained with a non-synchronous clock 136 and line increments each equal to one-half the vertical dimension 54 of a stylus having a rectangular end. This enables the mechanical advantages of a larger stylus cross section when high resolution is desired.

REFLECTANCE CONVERSION SYSTEM

FIGS. 9 and 10 schematically illustrate one form of electronic circuitry that can be utilized as a reflectance conversion system of the type described hereinabove in connection with FIG. 5. Referring to FIG. 9, clock pulse generator 154 produces a train of clock pulses 156 that are applied to and amplified by transistors 158 and 160 and their associated circuits producing amplified pulses 162. FET 164 receives and applies amplified pulses 162 to operational amplifier 166, the output of which feeds back through FET 164 and to the input terminal through capacitor 168 to form a sawtooth wave generator. FET 164 shorts capacitor 168 at each clock pulse. The resulting output is a series of ramp voltage pulses 172 that are transmitted through resistor 174 to one input of comparator 176.

Simultaneously, the negative going analog signal, representing the amplitude of the reflectance of the original document, is received at terminal 138 and feeds through resistor 178 to operational amplifier 180. The output of operational amplifier 180, here shown as voltage waveform 184, whose amplitude is proportional to the reflectance, is applied through resistor 186 to the other input of comparator 176. Whenever the amplitude of voltage waveform 184 exceeds the amplitude of sawtooth waveform 172 for any period of time, comparator 176 produces a negative output pulse 188 of constant amplitude, but having a pulse width equal to such period of time. It will be seen that the greater the amplitude of voltage waveform 184, the longer will be the pulse widths of output pulses 188. Transistor circuit 190 merely inverts pulses 188, producing positive going output pulses 192 at terminal 194.

Referring to FIG. 10, positive going pulses 192 appear at terminal 194 and feed through diode 196 to the base of transistor 198. The output of transistor 198 is applied to the circuits associated with transistors 181 and 183, which circuits invert and amplify the inverted output pulses of transistor 198 and apply large positive going signal pulses 185 to grid 187 of tube 189 which may be a 25BQ6. With a plate supply voltage of $+(V_1$ $+ V_2$) (the amplitude of the $+V_1$ level plus the amplitude of the $-V_2$ level of FIGS. 2 and 3) and a positive going signal pulse 185, tube 189 conducts presenting a very low resistance to ground to the plate supply voltage and associated power resistor 191 and to negative bias $-V_2$ of battery 193. As a result, output terminal 195 substantially has negative bias potential $-V_2$ for the time duration of pulses 185. However, whenever there is no positive going pulse 185 at grid 187, tube 189 is driven into the cut-off region of operation and ceases to condut. The voltage potential at node 197 rises to $+(V_1 + V_2)$ and the voltage at output terminal 195 rises to $+V_1$.

A specific embodiment of a system for producing grey scale by the use of an $m \times n$ array converter is illustrated in FIGS. 11, 12, 13 and 13A. As described earlier, in order to generate grey scale with this technique, the reflectance for each increment $d_s$ of a scan line is determined and a signal is developed having a voltage level corresponding to the specific reflectance level. Each cell in the scan line having a distance $d_s$ along the scan line and a width equal to the width, $w$, of the scan line, is to be represented on the recorded copy by toning black selected areas on a matrix of $m \times n$ areas. This provides for a grey tone resolution of $m \times n$ levels. Using such a matrix, each increment or cell $d_s$ along a recorded line must have n marking signals along it and for each scan of the copy, there must be produced m recording traces. In the system illustrated in FIGS. 11, 12, 13 and 13A, the matrix is a $4 \times 4$ matrix which results in 16 different levels of grey requiring four recorded line traces in the time in which one line of the original copy is scanned and requiring that for each cell for which reflectance is measured, there be capability to produce four marking signals on each recorded trace.

To operate such a system clocking signals are required for generating the recorded traces at the rate of four times per line scan and in addition sufficient memory is required to store both the reflectance information for an entire line and also the conversion factors setting forth, for each level of reflectance, which areas in the $m \times n$ matrix are to be marked black.

With reference now to FIG. 11, the video signal from the scanner is supplied as the input signal to an analog to digital converter unit 200. The analog to digital converter 200 provides a 4 bit, parallel output constituting a 4 bit digital representation of the analog voltage applied from the video scan line. The circuit of FIG. 11 includes eight shift registers 211 through 218, each having Z bits of storage within it, where Z is the total number of cells to be included in each scan line. The shift registers are arranged in two banks of four registers each, shift registers 211 through 214 constituting one bank while shift registers 215 through 218 constitute the second bank.

The operation of the banks of shift registers is such that one set of shift registers is receiving and storing input information from the analog to digital converter 200 at a clock rate $F_s$, while the other bank of shift registers is recirculating the information previously stored within it at a clock rate $4F_s$ and simultaneously providing output signals to control the marking of the recording traces on the new copy. The banks of registers alternate in function for alternate scan lines, the selection of inputs being controlled by a series of control gates 201 through 208, each associated with the input of a corresponding shift register.

The control circuit for selecting which of the two banks is operating and for providing the appropriate clocking signals is shown in FIG. 12, as well as in FIG. 11.

The specifics of the generation of the appropriate clock signals are illustrated in FIG. 12. An oscillator provides an input signal at a rate $16F_s$ to a series of dividers, each of the first two dividers 285 and 286 being $\div$ 4 elements, with the output from divider 285 being a $4F_s$ signal and the output from divider 285 being the $F_s$ signal. The $F_s$ signal is supplied as the input to a second series of three dividers, $a \div z$ unit 288 followed by a $\div$ 2 unit 289 and a second $\div$ 2 unit 290. The output from the $\div$ z unit 288 is $F_s/z$ or $4F_e$. The output, then, from $\div$ 2 unit 289 is $2F_e$ and the output from divider 290 is $F_e$. A reset signal to these latter three dividers is provided from phasing electronics which may be included in the entire system to phase initiation of the scan line with each of the clocking signals.

The basic determination of which bank of shift registers is operated is effected by the action of control flip-flop 240 which has an input signal $F_e$, each $F_e$ signal changing the state flip-flop 240. Pulses $F_e$ are produced at the end of each scan line. Flip-flop 240 has a Q output connected directly as an input signal to all of the gates 201 through 208. This same signal switches clocking signals $F_a$ and $F_b$ for clocking the banks of shift registers. The Q output from flip-flop 240 is supplied as one input to a pair of NAND gates 242 and 244 with the other input to NAND gate 242 being supplied from the clock source $F_s$ and the other input to NAND gate 244 being supplied from clock source $4F_s$. The $\bar{Q}$ output from control flip-flop 240 is supplied as one input to each of a second pair of NAND gates 243 and 245, with the second input to NAND gate 243 being supplied from the clock output $4F_s$ and the second input to NAND gate 245 being supplied from clock output $F_s$. The outputs from NAND gates 242 and 243 are supplied as inputs to NAND gate 248, the output from this NAND gate being the $F_a$ clock signal for operating shift registers 211 through 214. The outputs from NAND gates 244 and 245 are supplied as input signals to NAND gate 249, the output from this NAND gate, designated $F_b$ being supplied to shift registers 215 through 218 as a shifting signal. It may be seen that when flip-flop 240 has its Q output activated (and a corresponding not activated value for $\bar{Q}$) the signal $Fa$ is $Fs$ and the signal $Fb$ is $4fs$. Similarly when flip-flop 240 is in the opposite state $Fa$ is $4Fs$ and $Fb$ and $Fs$.

Each of the input control gates 201 through 204, controlling shift registers 211 through 214 respectively, are identical and are of the form illustrated with respect to gate 201. Similarly each of the input control gates 205 through 208, controlling shift registers 215 through 218 are identical and have the form illustrated with respect to gate 205. Control gate 201 includes a pair of NAND gates 225 and 226, the outputs from these NAND gates being supplied as inputs to NAND gate 227. One input to NAND gate 226 is supplied through inverter 229 from the Q output of flip-flop 240, the other into NAND gate 226 being supplied from the output of the corresponding shift register. NAND gate 225 has one input leg connected directly to the Q terminal of flip-flop 240, while the other input leg is supplied from one of the bit outputs from the analog to digital converter 200. The configuration of NAND gates 231 and 232 within control gate 205 is arranged similarly to gates 225 and 226, except that NAND gate 232, which has one input leg connected to the output of the corresponding shift register has a signal from the Q terminal of flip-flop 240 supplied directly to its other input leg, while the output from the Q terminal is supplied through an inverter to one input leg of NAND gate 231, the other input to this NAND gate 231 being supplied from the bit outputs of the analog to digital converter 200. It may be seen that when flip-flop 240 has a Q output activated the input control gates 201 through 204 connect the data lines from the analog to digital converter to the shift register 211 through 214 while disconnecting the output. Control gates 205 through 208 connect the output of the shift register 215 through 218 to the shift register input in a recirculating manner while disconnecting the data lines from the analog to digital converter.

The operation is such that for one scan line, the Q output from control flip-flop 240 will be actuated providing the clock pulses $F_a$ at a clock rate $F_s$, corresponding to one shift for each cell of the scan line and the gating within control gates 201 through 204 being such that input data from the analog to digital converter 200 is entered into the shift register and there is no recirculating connection. During this scan line the second bank of shift registers 215 through 218 are being clocked by $Fb$ at a rate of $4F_s$ and control gates 205 through 208 provide that the output from each of the associated shift registers is recirculating to the input, as well as being supplied on the output lines themselves.

Control gates 260 through 263 couple the outputs from the recirculating shift registers as four parallel bit inputs into a read only memory 267. Read only memory 267 provides a parallel four bit output to shift register 270, which is characterized by receiving a four bit parallel input at a rate $4Fs$ and providing those bits in serial output form at a rate $16Fs$.

The logic within each of these output control gates 260 through 263 is shown with respect to gate 260. Into gate 260 there are supplied the output signals from shift register 211, from shift register 215 and the Q terminal of control flip-flop 240. The Q terminal is connected directly at one input to NAND gate 275 and through inverter 276 as an input to a second NAND gate 278. The output from shift register 211 is supplied directly as a second input to NAND gate 278, while the output from shift register 215 is supplied directly as the other input to NAND gates 275. The outputs of NAND gates 275 and 278 are connected as inputs to NAND gate 280, the output from this NAND gate being supplied as one of the control input bits to the read only memory 267. Each of the other gates 261 through 263 are constructed in similar fashion, with the input signals being from successive shift registers having corresponding positions in each bank. It may be seen that when flip-flop 240 Q output is activated that the inputs from shift register 215 through 218 are activated by gates 260 through 264. Similarly when flip-flop 240 is in the opposite state the inputs from shift registers 211 through 214 are activated by gates 260 through 264.

The operation of the above set of elements provides that while a scan line of information is being secured, the reflectance value for each cell in a preceding line already stored in the other set of shift registers, will be provided as 4 bit digital numbers, each 4 bit number being generated at a rate four times the scan rate of the video scan element, thereby providing that the reflectance information for the entire line will be made available for each of the four separate traces within one full scan. It is the purpose, then, of the read only memory 267 to respond to each applied 4 bit signal by providing a 4 bit output to the shift register 270 for each of the four scan lines. It will be understood that for a particular scan cell, which has a specified value of reflectance, the four series bits from the shift register 270 may vary from one trace to the next of the four traces, since a particular level, for example, calling for thirteen matrix points to be marked black, cannot be carried out by producing the same number of marks per trace line. Thus, the read only memory 267 must contain sufficient information to produce the correct series of marking signals for each of the four traces, depending upon the reflectance value of the original cell.

One form of read only memory construction suitable for this purpose is illustrated in FIG. 13. The read only memory there shown will be considered as a series of matrix points having 64 rows and four columns. The four columns provide each of the 4 output bits supplied to shift register 270 at the output terminals from each of four inverters 300, 301, 302 and 303. Each of the rows in the memory has an input NAND gate such as shown at $A_1$, $A_2$, $A_3$ . . . $A_{64}$. There are, of course, 64 such gates, corresponding to each row of the memory matrix. Each of the NAND gates has six input leads, four corresponding to the output bits from the recirculating shift registers, and therefore corresponding to the separate bits of the digital representation of the reflectance for a given cell, while the remaining 2 inputs to each of the NAND gates are supplied from the signals $2F_e$ and $F_e$. As will be seen from the input circuit designation in FIG. 13a, each of the input signals are supplied through a series of inverters 320 through 325 to provide both the original signal and its inverse. The clocking inputs $F_e$ and $2F_e$ provide the trace control information, with the reflectance input bits providing the reflectance value. Thus the information stored in the read only memory matrix, 267 predetermined for any value of reflectance for each cell will control which of the four bits on each of four successive traces shall result in a black mark or a white space.

While a specific component system has been described above, many of the functions of this system in terms of memories, clocking and logic may be carried out by a general purpose computer, suitably programmed.

VARIATIONS

Driver 140 and converter 134 in FIGS. 9 and 10 apply positive voltage pulses to control the time durations of the levels of binary signals applied through terminal 195 to styli 118 of FIG. 4. Those skilled in the art will appreciate that pulses 188 in FIG. 9 (the inverse of pulses 192) could be used as an input to driver 140 of FIG. 10 for the opposite mode of operation, in which a toner of opposite polarity is used.

Other electronic means will occur to those skilled in the electronic arts for controlling the time durations of the levels of the binary signals including transistor drivers.

FIG. 4 shows reflectance amplitude-to-pulse-width converter system 132 as part of recorder electronics 116. In some applications it may be desirable to incorporate clock 136 and converter 134 as part of transmitter electronics 112.

In a number of applications grey scale is not transmitted; only black and white are transmitted. In such situations, the reflectance conversion system is not needed, and driver 140 may be modified, if necessary, to receive the input train of binary signals. For example, it may be only necessary to add a simple inverter circuit at the input of driver 140. Obviously, different modifications may be derived by those skilled in electronics.

In the facsimile system of FIG. 4 a single stylus 118 writes each line. It is possible to use a plurality of styli arranged in a fixed array as part of a facsimile system or a graphic recorder. In such a recorder all paper-styli relative velocities are derived from the motion of the paper over the styli. In this configuration styli may or may not overlap. Each stylus may be operated in accordance with the foregoing disclosures. Video input to this type of recorder may be derived from a facsimile system or may comprise any other type of graphic data in proper format.

In another variation of grey scale recording, reflectance waveform 184 of FIG. 9 can be utilized to control the pulse repetition rate of a pulse generator, the number of output pulses of which vary with the amplitude of reflectance, the pulses having constant, predetermined pulse widths, the pulse repetition rate having a predetermined range. These pulses can then be applied to driver 140, modified as required to control the deposition of writing charges and the cancellation of deposited charges.

SUMMARY

The method and apparatus of the present invention provide a canceling potential on the recording stylus or styli except when charges of opposite polarity are to be deposited. This reduces the length of a mark in the transverse, recording direction. Utilizing line increments, where the increments are fractions of the styli dimensions perpendicular to the paper/styli velocity, reduces the height of the mark in the direction perpendicular to the stylus/paper velocity. The result is resolution better than 600 lines per inch. Grey scale recording is achieved by use of the reflectance to pulse width conversion system described including an $m \times n$ conversion system.

While the method of the invention has been disclosed and described with reference to illustrative embodiments of apparatus for practicing the same, it will be understood by those skilled in the art that the foregoing and other changes in form and details may be made therein without departing from the spirit and scope of the invention.

We claim:

1. A method of recording binary signals, through a recording stylus, on an electrostatic medium, comprising:

applying to the recording stylus while the stylus and the electrostatic medium are undergoing relative translatory motion in a first direction, a potential of one polarity with respect to a point of potential reference whenever the binary signal has a first value, there-by depositing charges of one polarity and producing a charged field of predetermined area within the charging influence of said stylus on the recording medium;

maintaining on the recording stylus a potential of opposite polarity with respect to said point of potential reference to cancel charges of said one polarity that appear on the recording medium in an area within the charging influence of said stylus during the time when said binary signal has its second value; and effecting relative translocation between the electrostatic recording medium and the stylus in predetermined increments in a second direction in the plane of the medium normal to said first direction, wherein said increments are less than the dimension of said predetermined area in said second direction.

2. The method as in claim 1 in which the increments in said second direction are equal.

3. The method of claim 1 further comprising the prior step of deriving the binary signals from the reflectance desired for each line recorded in said first direction.

4. A method in accordance with claim 3 wherein for each recorded line in said first direction said translocation in said second direction is effected through a plurality of said predetermined increments.

5. A method of facsimile transmission and recording in accordance with claim 1, further comprising the prior steps of:

scanning an original document to be transmitted and recorded, line by line; and producing and transmitting a binary signal representing variations in reflectance in each line.

6. A method in accordance with claim 5 in which the lines scanned in the original document are separated by increments equal to said predetermined increments in said second direction.

7. The method as in claim 5 in which a plurality of increments in said second direction corresponds to each scanned line on the original document.

8. A method of facsimile transmission and recording comprising the steps of:

scanning an original document to be transmitted and recorded line by line;

producing a binary signal representing variations in reflectance of each line;

applying to at least one of a plurality of recording styli, while said styli and said recording medium are undergoing relative translatory motion in a first direction, a potential of one polarity with respect to a point of potential reference to deposit charges of one polarity and produce a charged field within the charging influence of said stylus of predetermined area in a recording medium whenever said binary signal has a first value; and maintaining those styli to which said potentials of one polarity were applied, at a potential of opposite polarity with respect to said point of potential reference, to cancel charges of said one polarity that appear in the recording medium in an area within the charging influence of the styli during the time when said binary signal has its second value; and effecting relative translocation between said recording medium and said styli in predetermined increments in a second direction in the plane of the medium normal to said first direction, said increments being smaller that the dimension of said predetermined charged area in said second direction.

9. A graphic recording system for recording binary signals through a recording stylus on an electrostatic recording medium during relative translatory motion therebetween, comprising:
- first and second potential sources;
- means for effecting relative translatory motion in a first direction between said recording stylus and said medium;
- electronic circuit means adapted for connecting the first potential source with a first polarity with respect to a point of potential reference to the recording stylus for time durations equal to the time durations when the binary signals have a first value to deposit charges of one polarity and produce a charged field of predetermined area on the recording medium while said medium and said recording stylus are undergoing relative translatory motion in said first direction and for maintaining the second potential source connected as a canceling potential with respect to said point of potential reference to the recording stylus with a polarity opposite to the polarity of the first potential source to cancel charges of said one polarity when the binary signals have a second value; and
- means for effecting relative translocation between the electrostatic recording medium and the stylus in predetermined increments in a second direction in the plane of the medium normal to the first direction, wherein said predetermined increments are less than the dimension of said predetermined area in said second direction.

10. Apparatus in accordance with claim 9 further comprising:
- means for scanning an original document to be transmitted and recorded, line by line; and
- means for producing and transmitting a binary signal representing variations in reflectance in each line.

11. The system as in claim 9 in which the increments are equal.

12. The system as in claim 9 in which each increment is shorter than the dimension of the stylus in said second direction.

13. The system as in claim 9 further comprising means for deriving the binary signals from the reflectance desired for each recorded line in said first direction in the recording medium.

14. The system as in claim 13 in which a plurality of increments in said second direction corresponds to each recorded line in said first direction.

15. A system in accordance with claim 9 wherein said recording system includes a plurality of styli.

16. A method of recording binary signals derived from a desired reflectance value for a specified area, defined as a cell, on an electrostatic medium through a recording stylus comprising:
- deriving a plurality of said binary signals for each of said cells, the sum of the total time durations when said plurality of binary signals have a first value being proportional to the value of reflectance for each cell;
- applying to the recording stylus while the stylus and the electrostatic medium are undergoing relative translatory motion in a first direction, a potential of one polarity with respect to a point of potential reference whenever each binary signal has a first value, thereby depositing charges of one polarity and producing a charged field of predetermined area within the charging influence of said stylus on the recording medium; and
- maintaining on the recording stylus a potential of opposite polarity with respect to said point of potential reference to cancel charges of said one polarity that appear on the recording medium in an area within the charging influence of said stylus during the time when each binary signal has its second value.

17. The method of claim 16 wherein said plurality of binary signals for each cell comprise a train of signals, each having a first value for a time duration proportional to the desired reflectance for said cell.

18. The method of claim 16 further comprising the prior steps of:
- producing an analog signal proportional to the amplitude of the desired reflectance for each cell;
- sampling the analog signal at a clock rate; and
- producing a series of binary signals at the clock rate each having a time duration at said first value proportional to the amplitude of corresponding samples.

19. The method as in claim 16 further comprising the prior steps of:
- generating for each of said cells a plurality of signals cor-responding to a plurality of trace lines to be recorded on said recording medium;
- producing for each of said trace lines a plurality of binary signals for each cell, the total number of signals of said first value for the sum of said trace lines being proportional to the value of reflectance for each cell.

20. The method as in claim 16 wherein for each of said cells said plurality of binary signals are derived such that the total number of said signals at said first value is proportional to the value of reflectance for each cell.

21. A method of facsimile transmission and recording comprising the steps of:
- scanning in said first direction an original document to be transmitted and recorded, line by line;
- producing and transmitting a signal to be recorded representing variations in reflectance for contiguous specified areas, each defined as a cell, in each line;
- deriving a plurality of said binary signals for each of said cells, the sum of the total time durations when said plurality of binary signals have a first value being proportional to the value of reflectance for each cell;
- applying to the recording stylus while the stylus and the electrostatic medium are undergoing relative translatory motion in a first direction, a potential of one polarity with respect to a point of potential reference whenever the binary signal has a first value, thereby depositing charges of one polarity and producing a charged field of predetermined area within the charging influence of said stylus on the recording medium; and
- maintaining on the recording stylus a potential of opposite polarity with respect to said point of potential reference to cancel charges of said one polarity that appear on the recording medium in an area within the charging influence of said stylus during the time when said binary signal has its second value.

22. The method of claim 21 wherein said plurality of binary signals for each cell comprise a train of signals, each having a first value for a time duration proportional to the desired reflectance for said cell.

23. The method of claim 21 further comprising the prior steps of:

producing an analog signal proportional to the amplitude of the desired reflectance for each cell;

sampling the analog signal at a clock rate; and producing a series of binary signals at the clock rate each having a time duration at said first value proportional to the amplitudes of corresponding samples.

24. The method as in claim 21 wherein for each of said cells, said plurality of binary signals are derived such that the total number of binary signals at said first value is proportional to the value of reflectance for each cell on said scan line.

25. The method as in claim 21 further comprising the prior steps of:

generating for each of said lines scanned on the original document a plurlaity of trace lines to be recorded on said recording medium; and producing for each of said trace lines a plurality of binary signals having a first value for each cell along said scan lines, the total number of binary signals at said first value for the sum of said trace lines being proportional to the value of reflectance for each cell on said scan line.

26. A facsimile grey scale transmitting and recording system comprising:

means for scanning in a first direction an original document to be transmitted and recorded, line by line, and for producing binary signals representing the reflectance of said original document for a series of specific areas, defined as cells, along said scanning line;

a recording stylus and means for effecting relative translatory motion in said first direction between said recording stylus and an electrostatic recording medium;

first and second potential sources; and electronic circuit means adapted for connecting the first potential source with a first polarity with respect to a point of potential reference to the recording stylus for time durations equal to the time durations when the binary signals have a first value to deposit charges of one polarity and produce a charged field of predetermined area on the recording medium while said medium and said recording stylus are undergoing relative translatory motion in said first direction and for maintaining the second potential source connected as a canceling potential with respect to said point of potential reference to the recording stylus with a polarity opposite to the polarity of the first potential source to cancel charges of said one polarity when the binary signals have a second value;

said means for producing said binary signals producing, for each cell along said scanning line, a plurality of binary signals at said first value, the sum of the time durations when said plurality of binary signals has said first value being proportional to the value of reflectance for each cell.

27. A system in accordance with claim 26 wherein said means for producing for each of said cells a plurality of binary signals, produces a total number of binary signals at said first value proportional to the value of reflectance for each cell on said scan line.

28. A system in accordance with claim 26, wherein said means for producing binary signals includes:

means for producing analog signals proportional to the amplitude of the desired reflectance; and means for sampling each analog signal at equal intervals of time and producing a plurality of corresponding binary signals, each signal having said first binary value for a time duration proportional to the amplitude of corresponding samples.

29. The system of claim 28 in which the means for producing analog signals and the means for sampling includes:

a ramp signal generator for producing a plurality of ramp voltages at a predetermined rate; and a conversion system arranged to produce a series of output pulses, each having a pulse width equal to the time that a corresponding ramp voltage exceeds the amplitude of an analog signal.

30. A system in accordance with claim 26 including means for generating for each of said lines scanned on the original document a plurality of trace lines on said recording medium and wherein said means for producing binary signals include means for producing for each of said trace lines a plurality of binary signals, the total number of said binary signals at said first value for the sume of said trace lines being proportional to the value of reflectance for each cell on said scan line.

31. Apparatus in accordance with claim 30 and further including memory means for storing, for each value of reflectance information sufficient to produce a predetermined pattern of binary signals at said first value on each of said trace lines for each cell.

32. A graphic recording system for recording binary signals through a recording stylus on an electrostatic recording medium during relative translatory motion therebetween, comprising:

means for producing binary signals derived from the reflectance desired for a specified area, defined as a cell;

said means producing for each cell a plurality of binary signals at a first value, the sum of the time durations when said plurality of binary signals has said first value being proportional to the value of reflectance for each cell;

means for effecting relative translatory motion between said recording stylus and said electrostatic recording medium;

first and second potential sources;

electronic circuit means adapted for connecting the first potential source with a first polarity with respect to a point of potential reference to the recording stylus for time durations equal to the time durations when the binary signals have said first value to deposit charges of one polarity and produce a charged field of predetermined area on the recording medium while said medium and said recording stylus are undergoing relative translatory motion in said first direction and for maintaining the second potential source connected as a canceling potential with respect to said point of potential reference to the recording stylus with a polarity opposite to the polarity of the first potential source to cancel charges of said one polarity when the binary signals have a second value.

33. A method of recording binary signals derived from a desired reflectance value for a specified area, defined as a cell, on an electrostaitc medium through a recording stylus comprising:

deriving a plurality of said binary signals for each of said cells, the sum of the total time durations when said plurality of binary signals have a first value being proportional to the valve of reflectance for each cell;

applying to the recording stylus while the stylus and the electrostatic medium are undergoing relative translatory motion in a first direction, a potential of one polarity with respect to a point of potential reference whenever each binary signal has a first value, thereby depositing charges of one polarity and producing a charged field of predetermined area within the charging area of said stylus on the recording medium;

maintaining a potential of opposite polarity with respect to said point of potential reference on the recording stylus to cancel charges of said one polarity that appear on the recording medium in an area within the charging influence of said stylus during the time when each binary signal has its second value; and effecting relative translocation between the electrostatic recording medium and the stylus in predetermined increments in a second direction in the plane of the medium normal to said first direction, wherein said increments are less than the dimension of said cell area in said second direction.

34. The method as in claim 33 wherein for each of said cells, said plurality of binary signals are derived such that the total number of said signals at said first value is proportional to the value of reflectance for each cell.

35. The method of claim 33 wherein said plurality of binary signals for each cell comprises a train of signals at said first value, each having a time duration proportional to the desired reflectance for said cell.

36. The method of claim 33 further comprising the prior steps of:

producing an analog signal proportional to the amplitude of the desired reflectance for each cell;

sampling the analog signal at a clock rate; and producing a series of binary signals at said first value at the clock rate each having a time duration proportional to the amplitudes of corresponding samples.

37. The method as in claim 33 further comprising the prior steps of:

generating for each of said cells a plurality of signals corresponding to a plurality of trace lines to be recorded on said recording medium, each of said trace lines being separated in said second direction by said predetermined increments; and producing for each of said trace lines a plurality of binary signals of said first value for each cell, the total number of signals for the sum of said trace lines being proportional to the value of reflectance for each cell.

38. A method of facsimile transmission and recording comprising the steps of:

scanning in a first direction an original document to be transmitted and recorded, line by line;

producing and transmitting a signal to be recorded representing variations in reflectance for contiguous specified areas, each defined as a cell, in each line;

deriving a plurality of said binary signals for each of said cells, the sum of the total line durations when said plurality of binary signals have a first value being proportional to the value of reflectance for each cell;

applying to the recording stylus while the stylus and the electrostatic medium are undergoing relative translatory motion in a first direction, a potential of one polarity with respect to a point of potential reference whenever the binary signal has a first value, thereby producing a charged field of predetermined area on the recording medium;

maintaining a potential of opposite polarity with respect to said point of potential reference on the recording stylus to cancel charges that appear on the recording medium in an area within the charging influence of said stylus during the time when said binary signal has its second value; and effecting relative translocation between the electrostatic recording medium and the stylus in predetermined increments in a second direction in the plane of the medium normal to said first direction, wherein said increments are less than the dimension of said cell area in said second direction.

39. The method of claim 38 wherein said plurality of binary signals for each cell comprise a train of signals, each having a first value for a time duration proportional to the desired reflectance for said cell.

40. The method of claim 38 further comprising the prior steps of:

producing an analog signal proportional to the amplitude of the desired reflectance for each cell;

sampling the analog signal at a clock rate; and producing a series of binary signals at the clock rate each having a time duration at said first value proportional to the amplitudes of corresponding samples.

41. The method as in claim 38 further comprising the prior steps of:

generating for each of said lines scanned on the original document a plurality of trace lines to be recorded on said recording medium, each of said trace lines being separated in said second direction by said predetermined increment; and producing for each of said trace lines a number of binary signals having a first value for each cell along said scan lines, the total number of binary signals at said first value for the sum of said trace lines being proportional to the value of reflectance for each cell on said scan line.

42. The method as in claim 38 wherein for each of said cells, said plurality of binary signals are derived such that the total number of said signals at said first value is proportional to the value of reflectance for each cell on said scan line.

43. A graphic recording system for recording binary signals through a recording stylus on an electrostatic recording medium during relative translatory motion therebetween, comprising:

first and second potential sources;

means for effecting relative translatory motion in a first direction between said recording stylus and said medium;

means for producing binary signals derived from the reflectance desired for a specified area, defined as a cell, in the recording medium, said means producing for each cell a plurality of binary signals the sum of the time durations when said plurality of binary signals has a first value being proportional to the value of reflectance for each cell;

electronic circuit means adapted for connecting the first potential source with a first polarity with respect to a point of potential reference to the recording stylus for time durations equal to the time durations when the binary signals have said first value to deposit charges of one polarity and produce a charged field of predetermined area on the recording medium while said medium and said recording stylus are undergoing relative translatory motion in said first direction and for maintaining the second potential source connected as a canceling potential with respect to said point of potential reference to the recording stylus with a polarity opposite to the polarity of the first potential source to cancel charges of said one polarity when the binary signals have a second value; and means for effecting relative translocation between the electrostatic recording medium and the stylus in predetermined increments in a second direction in the plane of the medium normal to the first direction, wherein said predetermined increments are less than the dimension of said predetermined area in said second direction.

44. A facsimile grey scale transmitting and recording system comprising:

means for scanning in a first direction an original document to be transmitted and recorded, line by line, and for producing binary signals representing the reflectance of said original document for a series of specific areas, defined as cells, along said scanning line;

a recording stylus and means for effecting relative translatory motion in said first direction between said recording stylus and an electrostatic recording medium;

means for effecting relative translocation between the electrostatic recording medium and the stylus in predetermined increments in a second direction in the plane of the medium normal to the first direction, wherein said predetermined increments are less than the dimension of said cell area in said second direction;

first and second potential sources;

electronic circuit means adapted for connecting the first potential source with a first polarity with respect to a point of potential reference to the recording stylus for time durations equal to the time durations when the binary signals have a first value to deposit charges of one polarity and produce a charged field of predetermined area on the recording medium while said medium and said recording stylus are undergoing relative translatory motion in said first direction and for maintaining the second potential source connected as a canceling potential with respect to said point of potential reference to the recording stylus with a polarity opposite to the polarity of the first potential source to cancel charges of said one polarity when the binary signals have a second value;

said means for producing said binary signals producing, for each cell along said scanning line, a plurality of binary signals at said first value, the sum of the time durations when said plurality of binary signals has said first value being proportional to the value of reflectance for each cell.

45. A system in accordance with claim 44 wherein said means for producing binary signals includes:

means for producing analog signals proportional to the amplitude of the desired reflectance; and means for sampling each analog signal at equal intervals of time and producing a plurality of corresponding binary signals, each signal having said first binary value for a time duration proportional to the amplitude of corresponding samples.

46. The system of claim 45 in which the means for producing analog signals and the means for sampling includes:

a ramp signal generator for producing a plurality of ramp voltages at a predetermined rate; and a conversion system arranged to produce a series of output pulses, each having a pulse width equal to the time that a corresponding ramp voltage exceeds the amplitude of an analog signal.

47. A system in accordance with claim 44 including means for generating for each of said lines scanned on the original document a plurality of trace lines separated in said second direction by said predetermined increments on said recording medium and wherein said means for producing binary signals includes means for producing for each of said trace lines a number of binary signals at said first value for each cell along said scan lines, the total number of said binary signals at said first value for the sum of said trace lines being proportional to the value of reflectance for each cell on said scan line.

48. Apparatus in accordance with claim 47 and further including memory means for storing, for each value of reflectance information suf-ficient to produce a predetermined pattern of binary signals at said first value on each of said trace lines for each increment.

49. A system in accordance with claim 44 including means for generating for each of said cells a number of binary signals at said first value, the total number of said binary signals at said first value being proportional to the value of reflectance for each cell on said scan line.

* * * * *

PO-1050
(5/69)

UNITED STATES PATENT OFFICE
CERTIFICATE OF CORRECTION

Patent No. 3,757,036 Dated September 4, 1973

Inventor(s) Albert H. Libbey and David R. Spencer

It is certified that error appears in the above-identified patent and that said Letters Patent are hereby corrected as shown below:

Front page, left column, line 2 and line 5, delete "Libbet" and insert --Libbey--, each occurrence; line 15 delete "Golo" and insert --Gold--.
Column 3, line 22, delete "embodi-ment" and insert --embodiment--.
Column 5, line 26, delete "when", second occurrence, and insert --which--.
Column 6, line 15, delete "sich" and insert --such--; line 15 delete "elec-trostatic" and insert --electrostatic--; line 16, delete "corres-ponding" and insert --corresponding--; line 27, delete "large" and insert --charge--.
Column 11, line 65, delete "secured" and insert --accrued--.
Column 16, line 26, delete "cor-responding" and insert --corresponding--.
Column 18, line 28, delete "sume" and insert --sum--.
Column 22, line 47, delete "suf-ficient" and insert --sufficient--.

Signed and sealed this 19th day of March 1974.

(SEAL)
Attest:

EDWARD M.FLETCHER,JR.
Attesting Officer

C. MARSHALL DANN
Commissioner of Patents